SYSTEM FOR TESTING MAGNETIC MATERIALS

Original Filed March 25, 1953 3 Sheets-Sheet 1

INVENTORS
Jan A. Rajchman,
Raymond Stuart-Williams
& Richard O. Endres
BY Morris Rabai
ATTORNEY SYSTEM FOR TESTING MAGNETIC MATERIALS
Original Filed March 25, 1953 3 Sheets-Sheet 2
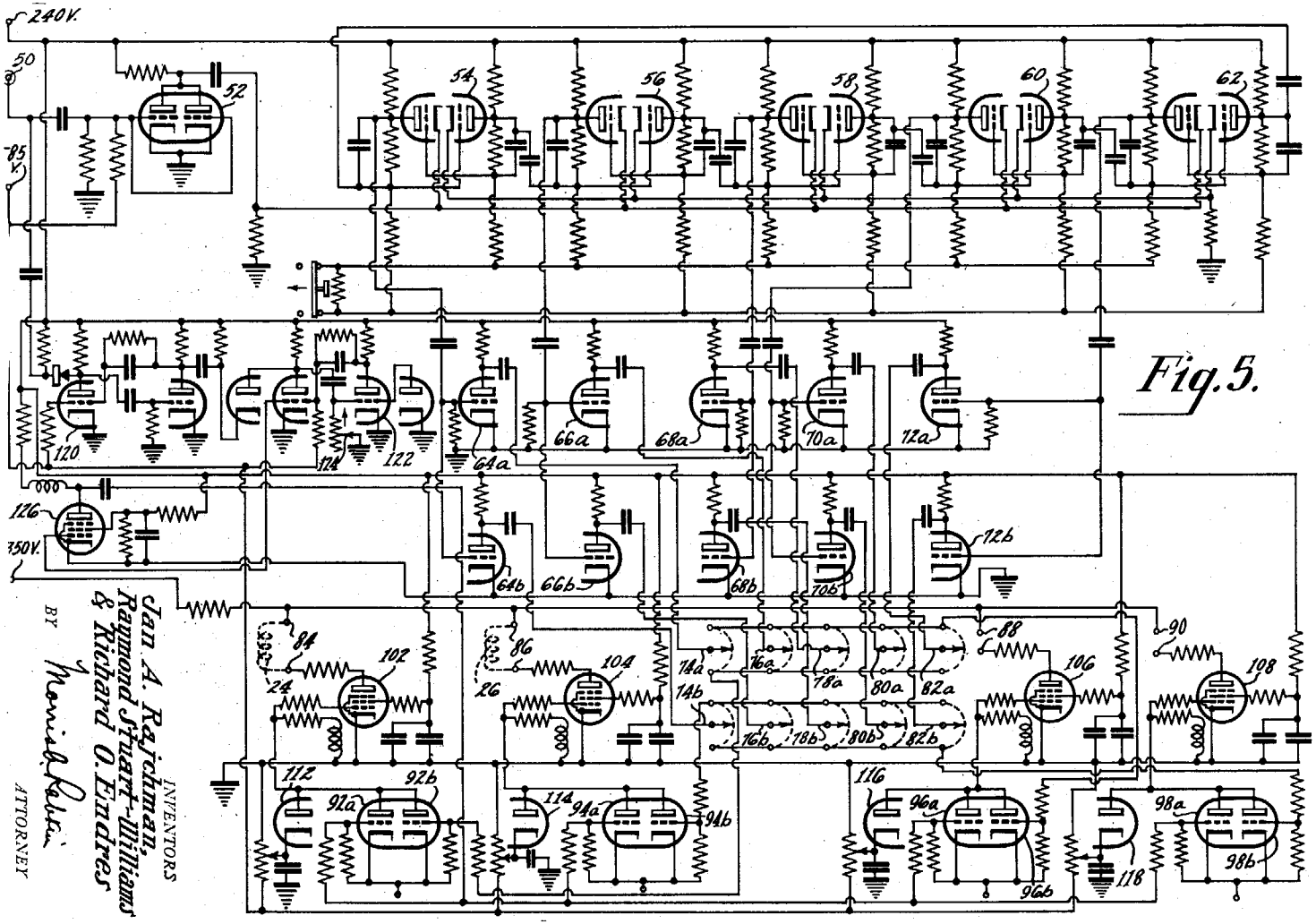
INVENTORS
Jan A. Rajchman,
Raymond Stuart-Williams
& Richard O. Endres
BY Morris Rabkin
ATTORNEY

SYSTEM FOR TESTING MAGNETIC MATERIALS

Original Filed March 25, 1953 3 Sheets-Sheet 3

INVENTORS
Jan A. Rajchman,
Raymond Stuart-Williams
& Richard O. Endres
BY Morris Rekten
ATTORNEY United States Patent Office Re. 24,359
Reissued Sept. 17, 1957

24,359

SYSTEM FOR TESTING MAGNETIC MATERIALS

Jan A. Rajchman, Princeton, N. J., Raymond Stuart-Williams, Los Angeles, Calif., and Richard O. Endres, Collingswood, N. J., assignors, by mesne assignments, to Radio Corporation of America, a corporation of Delaware Original No. 2,760,153, dated August 21, 1956, Serial No. 346,892, March 25, 1953. Application for reissue May 6, 1957, Serial No. 657,993

18 Claims. (Cl. 324—34)

Matter enclosed in heavy brackets [ ] appears in the original patent but forms no part of this reissue specification; matter printed in italics indicates the additions made by reissue.

This invention relates to a magnetic materials testing apparatus. More particularly, it relates to improved apparatus for testing magnetic cores.

One of the preferred methods for testing magnetic materials is to determine its hysteresis characteristic curve. From this characteristic such magnetic material parameters as coercive force, remanent and saturated induction, and initial and maximum permeability are obtainable. Most arrangements in the prior art are adapted to test magnetic cores having a physical size that enables them to be magnetically coupled into the test apparatus with relative ease. The testing is usually accomplished by placing the core within primary and secondary coils, the variation in coupling caused by the cores serving to give the test data. Further, their large size makes it easy to use as many turns in the coupled coils as are needed. However, when the core to be tested is small, it becomes difficult to use many turns, and, since the cross-sectional area is small, the resultant voltage is lower than is practical for test purposes.

Because of the coupling difficulties with small cores, on the order of one-sixteenth inch in overall diameter, it is quite difficult to obtain a sufficient voltage to permit an observation of a hysteresis loop. It is not practical to use a higher frequency sinusoidal magnetizing force drive upon the material being tested, to obtain more output voltage in a coupling secondary winding, because in some cases resulting increased eddy current losses would mask the desired information, and there are great difficulties in getting faithful amplification at high frequencies. Means for overcoming some of these difficulties, in accordance with this invention, provides pulsed magnetizing current to drive the material to be tested and uses the resulting voltage developed in a pickup coil to provide the required test information. This information may be displayed on the screen of an oscilloscope.

This invention is particularly designed for testing the type of cores that are used in a magnetic matrix memory system for computers, and in other related magnetic switching circuits, which require a multitude of magnetic cores of uniform magnetic properties. These cores are usually toroidal in shape with a relatively small inside diameter. The diameter of the whole in the core may be of the order of one-thirty second of an inch or less. The cores used at present are either wound out of very thin rolled metallic alloys on a ceramic bobbin or are molded ferrospinel types of material. In any case, the uniformity of magnetic properties depends a great deal on the care taken in the manufacturing techniques, which are quite critical.

The cores used in a magnetic matrix memory system are required to have a substantially rectangular hysteresis loop so that the residual magnetic induction and the magnetic induction present in a saturated condition are effectively the same. The polarity of the residual magnetism is used to represent the stored information. These systems are described by J. A. Rajchman in "RCA Review," volume XIII, pages 183–201, June 1952; J. W. Forrester in "Journal of Applied Physics," volume 22, pages 44–48, January 1951; and by W. N. Papian, "Proceedings of the I R. E.," pages 475–478, April 1952.

All of the cores comprising a matrix are coupled in rows and in columns of cores by individual single-turn coils through which information is stored on or read from the individual cores. This is accomplished by applying a current pulse to the coil coupling a particular row of cores and to the coil coupling a particular column of cores so that the single core lying in both the particular row and column is energized by both current pulses. The pulses of current supplied to each single-turn coil may be one half of the value required to set up a magnetomotive force sufficient to saturate the core. In this manner, the one-half H ampere turns (magnetomotive force) from each of the intersecting coils combine to provide a sufficient magnetomotive force to saturate the core in the direction desired. Because of the coil grid structure used, these one-half H pulses are also applied to the other cores in the row and column of the selected core. Therefore, there is a possibility that the magnetic polarity of these other cores may be disturbed if a driving pulse is in the opposite polarity to that of these other cores.

Thus, another requirement for a core may be that the coercive force of the core be more than one-half H. If the coercive force were less than one-half H, a pulse of that value and of opposite polarity to the magnetized core would, because of the rectangular hysteresis loop, reverse the magnetism of the core and cause false information to be stored. Also, it may be required that the coercive force of a core be less than H, or else the current drives used, although adequate for some cores, would not be sufficient to change the magnetic polarity of the core with the excessive coercive force. Consequently, the cores used must have substantially uniform coercive forces falling between one-half H and H to allow a uniform drive to be used in the memory system.

It would be difficult and expensive to control sufficiently the manufacture of the cores to insure uniformity of the degree needed in the magnetic memory and switching systems. It is simpler, more reliable and less expensive to screen-test the cores.

Accordingly, it is an object of this invention to provide apparatus adapted to test magnetic cores that are relatively small in size.

Another object of this invention is to provide apparatus adaptable for use in the pulse testing of magnetic cores.

It is a further object of this invention to provide novel apparatus for permitting the selection of cores having substantially uniform magnetic properties for utilization in a magnetic matrix memory.

Another object of this invention is to provide apparatus for testing magnetic cores under actual service conditions.

A further object of this invention is to establish an improved system for simply, rapidly and cheaply testing a large number of small cores for determining their magnetic properties.

These and other objects of this invention are achieved by utilizing apparatus including a metallic pin having non-magnetic properties. The pin has one end fixed to a base member of insulating material and the other end free to receive toroidal magnetic cores that are to be tested. Current pulses in opposite directions are applied to the pin by means of a transformer. The transformer secondary is connected to the fixed end of the pin and also to the free end by means of a sliding contact on a switching arm. A single-turn pickup coil is formed by means of an auxiliary pin mounted next to the main pin on the base member, and coupled to the fixed end of the main pin. The pickup coil is completed through the main pin by a second sliding contact on the switching arm engaging the free ends of both pins. The second sliding contact engages the free end of the main pin at a point closer to the test core than the point of engagement of the current carrying contact. Voltages induced in the pickup coil by the changing magnetic flux set up in the test core by the current pulses are displayed on an oscilloscope. If the resulting voltage waveshapes are within allowable limits, the test core is acceptable.

The above-described arrangement is incorporated in another embodiment of this invention, with which the characteristics of test cores may be directly compared with those of a standard core. Two core-supporting pins are provided, one for the standard core, and the other for the test core. Both pins are pulsed simultaneously. The pickup coil is arranged to link both cores, and the sense of winding of the cores is such that voltages induced by changes in flux in the cores are of opposite polarity. Thus, the signal produced is the difference between the two voltages to provide a direct comparison.

The features of this invention, both as to its organization and mode of operation, may be better understood from the following description when read together with the accompanying drawings in which:

Figure 5 is schematic circuit diagram of a pulse source used with the testing apparatus;

Figure 1:
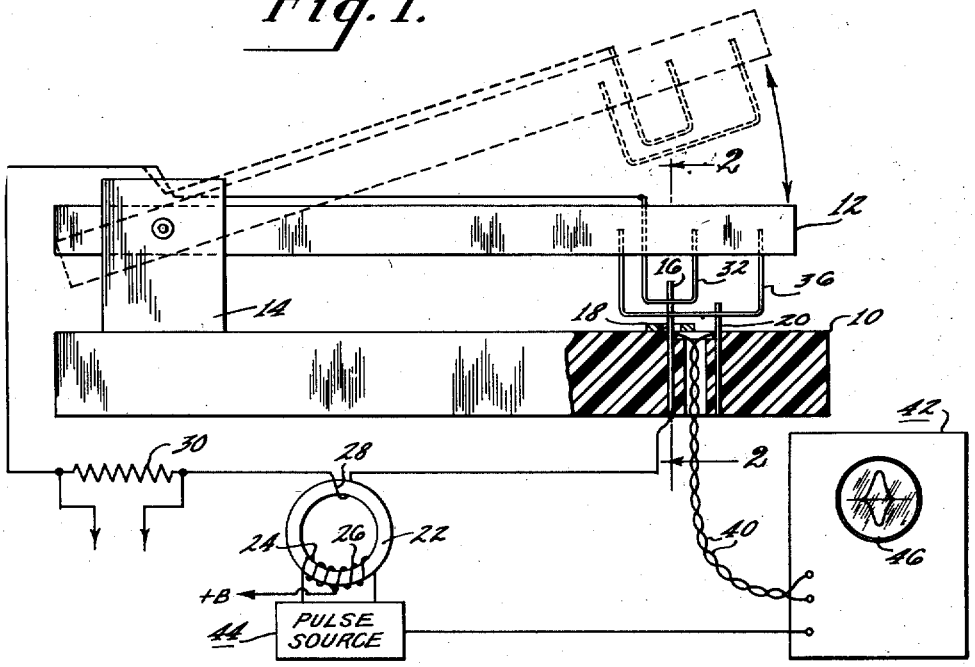
Figure 1 is a side view with parts cut away of apparatus embodying this invention for testing magnetic cores, and a block diagram of circuitry used therein.
Figure 2:
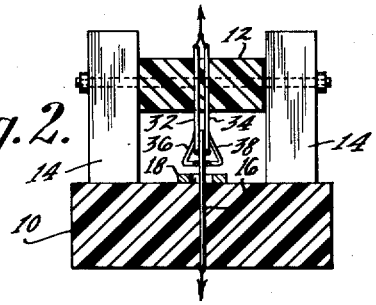
Figure 2 is a view of the apparatus along the line 2—2 of Figure 1.

Referring now to Figures 1 and 2, apparatus embodying this invention for testing magnetic materials may be seen. A frame is used for supporting some of the electrical components of the apparatus. The frame is made up of a base member 10, and a switching arm 12 pivoted for vertical movement in a pair of uprights 14 attached to one end of the base member 10. The frame members are made of insulating material, such as Bakelite. A metallic pin 16, made of non-magnetic material such as brass, is fixed in a hole in the other end of the base member 10. The pin 16 projects upwardly from the base member, and one end of this main pin 16 is free so that magnetic cores 18 to be tested may be threaded on the pin. This apparatus may be used with cores of toroidal shape, or of any other shape with a hole through it. An auxiliary pin 20 is also fixed in the base member 10, adjacent the main pin 16, and it also has a free end projecting upwardly from the base member.

Current pulses are applied to the main pin 16 by means of a driving transformer 22. The transformer 22 has a pair of primary windings 24, 26 oppositely wound, and a single secondary winding 28. The secondary 28 is connected at one end to the fixed end of the main pin 16 and at the other end through a current-regulating resistor 30 to a pair of current sliding contacts 32, 34 which are fixed to and project downwardly from the switching arm 12 adjacent the main pin 16. The sliding contacts 32, 34 are shown in the form of metallic loops which are separated a small distance for snugly receiving the main pin 16 between them (Figure 2). Mounted adjacent the current sliding contacts 32, 34 are a pair of voltage sliding contacts 36, 38. These voltage contacts are formed in the same manner as the other contacts, but in the form of a larger loop so that they extend further down from the switching arm 12, and also engage both the main and auxiliary pins.

The fixed ends of the main and auxiliary pins 16, 20 are connected by a pair of leads 40 to the vertical input of an oscilloscope 42. These lead wires 40 are twisted to balance out magnetic pick-up. A single-turn voltage-pickup coil through a test magnetic core is formed by a portion of the auxiliary pin 20, the lead wires 40, a portion of the main pin 16, and the voltage sliding contacts 36, 38 connecting the free ends of the two pins. The lead wires 40 are attached to the fixed ends of the pins 16, 20 at the upper surface of the base member 10, to reduce the size of the pickup coil, and keep to a minimum any possible magnetic pickup in that coil.

The primary coils 24, 26 of the transformer are connected to a current pulse source 44. Any suitable pulse source may be used. A preferred pulse source is described in detail below. A synchronizing pulse terminal 45 on the oscilloscope 42 receives synchronizing pulses from the pulse source 44 to key the horizontal sweep circuit in conjunction with the test pulses.

The test cores 18 can be threaded on the main pin 16 by means of a pointed permanent magnet (not shown). The magnetic cores tend to stand with their axis perpendicular to the axis of the pointed magnet. Consequently, it is easy to slip the pointed core over the main pin and then remove the magnet with the core held by the pin. After the core is threaded on the pin and resting on the base member 10, the switching arm 12 is closed to engage the current sliding contacts 32, 34 with the free end of the main pin, and the voltage sliding contacts 36, 38 with the free ends of the main and auxiliary pins. This completes the energizing-current circuit from the secondary 28 through the main pin 16, and also the pickup coil through the main and auxiliary pins.

The driving transformer 22 produces the high current required for the single energizing winding through the test core 18 provided by the main pin 16. By means of the arrangement of two opposing windings, opposing polarities of current flow may be produced in the secondary. The transformer core should be large so that it does not saturate. A relatively large resistance 30 is connected in series with the secondary winding to insure a current drive independent of the load provided by the test core. The actual energizing current flowing through the main pin may be measured by the voltage across this series resistance 30.

Figure 3:
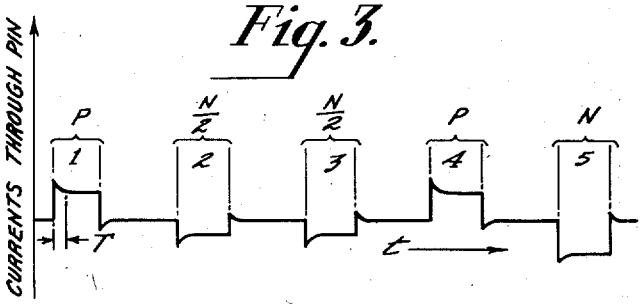
Figure 3 illustrates a typical set of waveshapes of the driving currents used for testing.

A typical pattern of current pulses which may be used to test the cores and application in a magnetic memory is shown in Figure 3. A train of positive and negative rectangular pulses, of full and half amplitude, $$P-\frac{N}{2}-\frac{N}{2}-P-N$$

is sent through the primaries of the driving transformer. Other patterns of current pulses may be used for testing cores which are to have other uses. In order that the secondary circuit be free of D. C. restoration problems, it is advantageous to use a balanced wave form in the primary; that is to say, there should be a much positive as negative current. It is apparent that the waveshapes shown in Figure 3 are balanced with the same negative as positive current.

The flux lines set up around the main pin by the current pulses applied to it, cut the core under test to change the magnetism of the core. This, in turn, induces a counter E. M. F. the pickup coil which includes a portion of the main pin. This voltage induced in the pickup coil is applied to the vertical input of the oscilloscope.

A relatively high voltage drop results from the flow of current through the current sliding contacts 32, 34. This voltage drop is also variable due to a contact with the main pin 16 of non-uniform resistance. Considerable error would result in the measurements if this voltage was added to the voltage induced in the pickup coil. Therefore, the second set of sliding contacts 36, 38 are used to complete the pickup coil, and these contacts engage the main pin intermediate the fixed end of the pin and the point of engagement of the current-carrying contacts. Thereby, the voltage between the fixed ends of the two pins, which is applied to the oscilloscope 42, does not include the voltage drop from the current contacts 32, 34 and is a true measure of the voltage induced by the test core.

To key on the oscilloscope horizontal sweep at the beginning of every current pulse applied to one of the transformer primaries, a keying pulse is applied to the oscilloscope horizontal input a few microseconds before the test pulses are applied to the main pin. In this manner, the waveshape induced in the pickup coil by each wave of current may be observed on the oscilloscope. The variations in waveshape will depend, of course, on the characteristics of the particular core being tested. By using a reasonably long persistance phosphor in the cathode ray tube, the various voltage waveshapes induced by the different current pulses can be observed superposed on each other.

Figure 4:
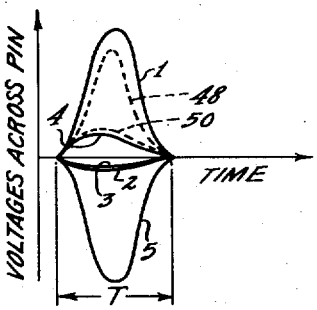
Figure 4 illustrates typical characteristic waveshapes obtained from cores under test.

Waveshapes typical of the results obtained are shown on the face 46 of the oscilloscope 42 in Figure 1. These are shown in greater detail in Figure 4. The voltage waveshapes in Figure 4 are numbered to correspond to the current pulses producing them as shown in Figure 3. With the application of a current pulse which causes a positive magnetomotive force to reverse the polarity of the core, the voltage induced in the pickup coil rises rapidly to a peak with the leading edge of the current pulse and then decays. A current pulse causing a negative magnetomotive force to reverse the polarity of the core produces substantially the same waveshape in a negative-going direction. Pulses of half amplitude produce relatively small disturbance voltages and pulses of the same polarity as the magnetic polarity of the core also produce relatively small disturbance voltages.

Tolerance waveshapes prescribing limitations to the regions within which the waveshapes of an acceptable core should fall may be drawn on a transparent plate superposed on the face of the oscilloscope. These tolerance waveshapes are shown in Figure 4 as broken line curves 48 and 50. For example, criterion for cores to be used in a matrix memory can be simply that the disturbance voltage peak be less than a certain specified value and the peak of an output voltage resulting from a reversal of polarity of the core be greater than a specified value. In this manner, the acceptability of cores may be determined at a glance.

After deciding whether the core is acceptable or not, the switching arm carrying the sliding contacts is lifted, and the test core is removed from the main pin with a pointed magnet. If a core does not meet the standards set, the switching arm may be pushed down to crush the core under the sliding contacts. The fragments are then simply brushed away, and the operation of removing the core is avoided.

Circuits to achieve a wide variety of pulsing waveforms and for varying the amplitude and duration of the applied magnetomotive forces can be designed in many different ways by those skilled in the art. The circuit of a preferred embodiment of pulse source is described in the patent application of Rajchman et al., Serial No. 290,388, filed May 28, 1952, now U. S. Patent No. 2,679,025, and is shown in Figure 5. A repetitive square wave pulse from an external square wave generator (not shown) is applied to the input terminal 50 and from there is applied to the grid of tube 52. While any known square wave generator to provide the square wave pulse may be used, one suitable type is described in Reich, "Theory and Applications of Electron Tubes," 1944, pages 359 and 360. The pulse is sharpened and amplified by tube 52, and applied to a five place ring counter circuit consisting of double triode tubes 54, 56, 58, 60 and 62, each of which is connected in a trigger circuit. One side of the output of each of these counter tubes is connected to the paralleled grids of two buffer tubes 64a and b to 72a and b, respectively. Each buffer tube has a single pole, double throw switch with a neutral position 74a and b to 82a and b respectively connected to its anode.

The pulse circuit is provided with four sets of output terminals 84, 86, 88, 90. The primary windings 24, 26 may be connected to any two of these terminals. The single pole, double throw switches with a neutral position provide the proper switching arrangement to energize the two of the four sets of output terminals to which the wires are connected. The single pole, double throw switches 74a and b to 82a and b connect the output of the buffer tubes to four dual-gate-tube driver circuits 92a and b to 98a and b, respectively, the outputs from which are applied to four power amplifier output tubes 102, 104, 106, 108. The driver gate tubes have their anodes connected together and then connected to the grids of the power amplifier tubes 102, 104, 106, 108. Both sections of each of the gate tubes 92a and b to 98a and b are normally conductive. Diode clamps 112, 114, 116, 118 set the output level of the power amplifiers.

The driver gate tubes 92a and b to 98a and b inclusive are actually dual gate tubes in order to permit variation in the width of the pulses used for testing. Tubes 92a and 98a inclusive may have pulses applied from the ring counter depending upon the position of the single pole, double throw, selection switches. These tubes constitute the first gate. If these were the only gates associated with the driving of the output tubes, the pulse width could not be varied without varying the frequency of the ring counters, consequently tubes 92b to 98b, constituting the second gates, are also used. To drive the second gates, a single shot delay multivibrator 120, which has a single cycle for each trigger pulse applied, otherwise called a delay univibrator, is triggered by the same input pulse from the pulse generator that triggers the ring counter 54 to 62. The output of the delay univibrator 120 is fed to a second univibrator 122 which generates a variable width output pulse. The selection of the pulse width is made by adjusting potentiometer 124 until the desired pulse width is obtained. This univibrator 122 is triggered by the back end of an output pulse from the delay univibrator 120. The output pulse from univibrator 122 is then applied to the grids of the second gate tubes 92b to 98b inclusive, through a buffer tube 126. The circuits are arranged so that the first gate tubes 92a to 98a may receive a 500 microsecond pulse from the counter, and second gate tubes 92b to 98b receive a pulse from the delay univibrator 122, which may be varied between 20 and 200 microseconds during the time any one of the first gate tubes inclusive are excited from the counter. The keying of the second gates by a variable width pulse, during the selection time of the first gates, yields a combined pulse of sufficient amplitude to overcome the bias of the power amplifier tubes and produce a variable width output pulse to the test circuit.

It is obvious that two or more of the output terminals 84, 86, 88, 90 may be connected to the same primary winding 24, 26, either one or the other in the test apparatus. The pulse circuit may then be programmed in such a way that there is obtained either one of the pulse amplitudes or their sum. The pulse to key the horizontal sweep of the oscilloscope is obtained from the delay univibrator 120.

In summary, the function of this pulse circuit is to generate a sequence of pulses which can be varied in amplitude and width. The sequence of pulses can be so programmed as to apply any combination of pulses, in a sequence of five pulses, to one, two, three or four outputs.

When a uniformity test is made on a large number of cores, ten thousand or more, it is very important that the driving currents remain constant through the whole period of the test. This may not be easy to realize because the tests may extend over a long period of time, months perhaps. It is, therefore, convenient to be able to calibrate the apparatus in terms of the voltages produced by a standard calibrating core. This core may be inserted in the regular test position and the driving currents adjusted until a standard waveshape is obtained on the measuring oscilloscope. In order to facilitate such a calibration and increase the accuracy of a uniformity comparison test of a large number of cores, testing apparatus may be used which permanently carries the standard core.

Figure 6:
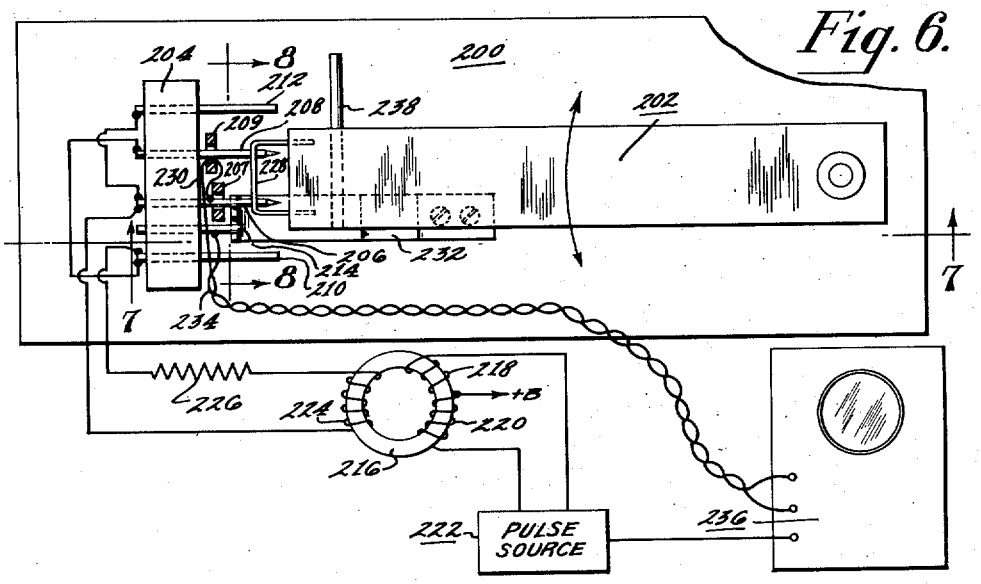
Figure 6 is a top view of another form of testing apparatus embodying this invention.
Figure 7:
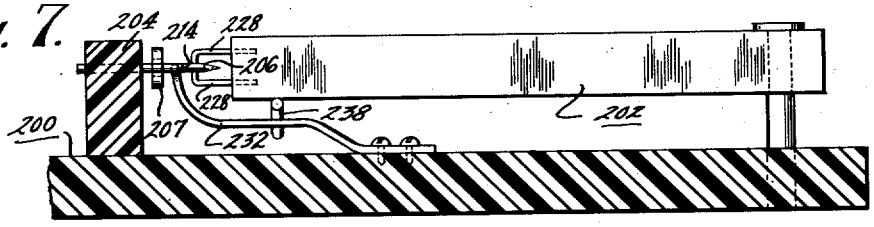
Figure 7 is a side view along the line 7—7 of Figure 6.
Figure 8:
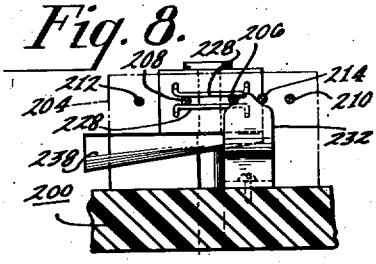
Figure 8 is a view along the line 8—8 of Figure 6.

Such testing apparatus which incorporates the features of this invention is shown in Figures 6, 7 and 8. The apparatus includes a frame made of insulating material and formed by a base member 200, a switching arm 202 pivotally mounted to one end of the base member 200 for movement in a horizontal plane, and an upright pin support 204 at the other end of the base member 200. Fixed in the upright are a plurality of metallic pins 206 to 214 made of non-magnetic material and extending horizontally. A first one 206 of the pins is used to carry a test core 207, and a second one 208 carries a standard core 209. These core-carrying pins 206, 208 are associated with a first and second auxiliary current-carrying pin 210, 212, respectively. The fifth pin 214 is an auxiliary voltage pickup pin mounted adjacent the test-core pin 206. Current pulses are applied to the core-supporting and current-carrying pins by means of a driving transformer 216 in an arrangement similar to that of the first embodiment of this invention. The transformer 216 has two primary windings 218, 220 which are pulsed by a pulse source 22 of the type previously described, in order that pulses of opposite polarity may be applied to the pins. One end of the secondary 224 of the transformer is connected through a current-regulating resistor 226 to the fixed ends of the standard-core pin 208 and the first current-carrying pin 210. The other end of the secondary 224 is connected to the fixed ends of the test-core pin 206 and second current-carrying pin 212. By means of a pair of sliding contacts 228 fixed to the end of the switching arm 202, the current path from the secondary 224 of the transformer is completed by connecting the free ends of two of the pins.

A voltage pickup coil having a single turn is formed by a wire 230 connected to the fixed end of the test-core pin 206 and linking the standard core 209 on the standard-core pin 208. The pickup coil is completed through a portion of the test-core pin 206, a shorting-bar contact 232, connecting the free ends of the test-core pin 206 and the auxiliary pickup pin 214, and a lead wire 234 connected to the pickup pin 214. The lead wires 230, 234 are twisted to eliminate magnetic pickup and are connected to the vertical input of an oscilloscope 236, in the manner previously described.

The shorting bar 232 is a spring contact having one end fixed to the base member 200, and the other end bent to engage the test-core and pickup pins 206, 214. The contact end of the shorting bar is V-shaped to engage the two pins closely. An interposer member 238 is attached to the switching arm 202 and movable with that arm. It has an inclined surface which engages the shorting bar 232 to depress that bar at the extreme position of the switching arm, when it only engages the first current-carrying pin 210, or is beyond that pin. In this way, the shorting bar contact 232 is disengaged from the test-core pin 206 in order that a test core may be threaded on that pin. The shorting bar 232 engages the test-core pin 206 at a point intermediate the fixed end of the pin and the point of engagement of the sliding contacts 228, in order that the pickup-coil voltages do not include the variable, high voltage drop at the sliding contacts.

Figure 9A:
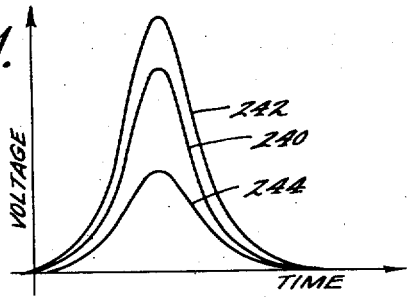
Figures 9a and 9b illustrate waveshapes obtained from cores under test with the apparatus of Figure 5.

When the switching contacts 228 engage the test-core pin 206 and the associated current-carrying pin 210, there is a current path completed through the test-core pin so that voltages are induced in the pickup coil. These voltages are not affected by the standard core 209 since there is no current through the standard-core pin 208. When the switching contacts 228 are moved to a position engaging the standard-core pin 208 and its current-carrying pin 212, voltages are induced in the pickup coil to produce an indication of the characteristics of the standard core. This position of the switching arm 202 is used to adjust the driving currents to a standard value. The voltage signals produced by tests in these two positions are shown in Figure 9a. The waveshapes shown are a first 240 produced by a pulse applied to the standard core alone and a second 242 and third 244 produced respectively by pulses applied to stronger and weaker test cores tested alone.

In the middle position of the switching arm, both core-supporting pins 206, 208 are engaged by the sliding contacts 228, and the current pulses excite both the standard and the test cores. The pickup coil has a sense of linkage with the standard core 209 and is coupled to the test-core and voltage pickup pins such that the voltages induced in the coil by the two cores 207, 209 are of opposite polarity. Thus, if the cores were identical the induced voltages would cancel each other and no reading signals would be obtained. The actual difference voltage observed in this second position of the switching arm 202 can be used as a very sensitive measure of uniformity. This can be appreciated by considering if there is any difference between the test core and the standard core, there will be a voltage signal of amplitude proportional to that difference, and its polarity will show the direction of the difference. The difference in voltage produced in this manner can be measured easily by increasing the gain of the measuring oscilloscope.

Figure 9B:
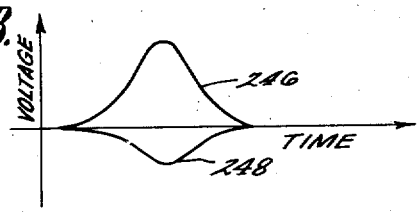

In Figure 9b, the voltage signals produced in the middle position of the switching arm are shown, testing the same cores as in Figure 9a. Thus, with the voltage produced by the standard core being bucked from that of the weaker test core, a positive-going wave-shape 246 is produced indicating that the test core is weaker than the standard core. Similarly, when the standard-core voltage is bucked by the greater voltage from the stronger test core, a negative-going waveshape 248 is produced indicating that the test core is stronger than the standard core. With the switching arm in the middle position, and with a train of current pulses such as previously described, the characteristics of magnetic cores may be tested.

Another form of tester apparatus embodying features of this invention are disclosed in the patent application to Rajchman et al., Serial No. 344,646, filed concurrently herewith on March 25, 1953. In this apparatus, a metallic core-supporting pin is mounted on a rotatable metallic wheel. A pair of current sliding contacts, and a pair of voltage sliding contacts engage the free end of the pin. Auxiliary current and voltage contacts engage a portion of the wheel to complete an energizing-current circuit and a voltage pickup coil through the pin in a manner similar to that described above.

There has been described above simple and reliable apparatus for testing the properties of small magnetic cores and for rapidly performing uniformity tests on a large number of magnetic cores.

What is claimed is:

1. A device for testing the characteristics of magnetic cores comprising an electrically-conductive, non-magnetic pin on which the cores to be tested are to be mounted, a path for supplying current to said pin connected to one end thereof and including first electrical contact means for completing said path to the other end of said pin, a single-turn, open pickup coil including second electrical contact means, and third electrical contact means coupled to said one end of said pin, and means for completing said current path and said pickup coil through said pin including means for engaging said first contact means with said other end of said pin and for engaging said second contact means with said third contact means and said other end of said pin whereby a voltage is induced in said pickup coil upon a change of current in said pin.

2. Apparatus for testing the characteristics of magnetic cores having a hole therethrough comprising means for supporting a core to be tested including an electrically-conductive, non-magnetic pin supported at a fixed end and adapted to receive cores at a free end thereof, means for applying current pulses alternatively to said pin in opposite directions therethrough, said pulse applying means being connected to the fixed end of said pin, a single-turn, open pickup coil coupled to the fixed end of said pin, voltage responsive utilization means coupled to said pickup coil, and contact means for removably connecting said pulse applying means and completing said pickup coil to the free end of said pin.

3. Apparatus for testing the characteristics of magnetic cores as recited in claim 2 wherein said means for applying current pulses alternatively to said pin in opposite directions therethrough includes a current transformer having a secondary winding and a pair of primary windings with opposite senses of winding.

4. Apparatus for testing the characteristics of magnetic cores having a hole therethrough comprising means for supporting a core to be tested including an electrically-conductive, non-magnetic pin supported at a fixed end and adapted to receive cores at a free end thereof, means for applying current pulses alternatively to said pin in opposite directions therethrough, said pulse applying means being connected to the fixed end of said pin, first eelctrical contact means for removably connecting said pulse applying means to the free end of said pin, a single-turn, open pickup coil including second electrical contact means, and third electrical contact means coupled to the fixed end of said pin, voltage responsive utilization means coupled to said pickup coil, and means for engaging said first contact means with the free end of said pin and for engaging said second contact means with said third contact means and the free end of said pin, said second contact means engaging said pin at a point intermediate the fixed end of said pin and the point of engagement of said first contact means.

5. Apparatus for testing the characteristics of magnetic cores having a hole therethrough as recited in claim 4 wherein said means for applying current pulses in opposite directions includes a current transformer having a secondary winding, and two primary windings, and a current-regulating impedance in series with said secondary winding.

6. A device for testing the characteristics of magnetic cores comprising a base member, an electrically-conductive, non-magnetic pin fixed at one end thereof to said base member with the other end thereof free whereby magnetic cores to be tested may be placed on said pin, a path for supplying current to said pin connected to one end thereof, a support member, a first electrical sliding contact for completing said path to the free end of said pin mounted on said support member, a single-turn open pickup coil including a second electrical sliding contact mounted on said support member, and a third electrical contact mounted on said base member and coupled to the fixed end of said pin, said base and support members being movably mounted relative to and adjacent each other for engaging said first contact with the free end of said pin and for engaging said second contact with said third contact and the free end of said pin to complete said current path and pickup coil through said pin.

7. A device for testing the characteristics of magnetic cores as recited in claim 6 wherein said first and second sliding contacts are positioned on said support member to engage said pin with the point of engagement of said second sliding contact lying between the fixed end of said pin and the point of engagement of said first sliding contact.

8. A device for testing the characteristics of magnetic cores as recited in claim 7 wherein said base member is made of insulating material, said support member is a switching arm pivotally mounted on said base member and made of non-conductive material, said third contact is an electrically-conductive, non-magnetic auxiliary pin having one end fixed to said base member and coupled to said core-supporting pin, said first and second sliding contacts are each a pair of contact elements for engaging on opposite sides of the free ends of said pins, and said path for supplying current to said core-supporting pin includes a secondary winding of a transformer and a current-regulating resistor in series therewith.

9. Apparatus for comparing the characteristics of magnetic cores having a hole therethrough comprising first and second electrically-conductive, non-magnetic core-supporting pins, first and second auxiliary current-carrying pins, an auxiliary voltage pickup pin, a base member supporting said pins at fixed ends thereof, a current transformer for applying current pulses to said core-supporting pins in one direction and alternatively in the opposite direction, the secondary of said transformer being connected to the fixed ends of said core-supporting and current-carrying pins, a switching arm pivotally mounted on said base member, a sliding contact fixed to said switching arm, said core-supporting and current-carrying pins being arranged on said base member whereby said switching arm may be moved to different positions for alternatively engaging said sliding contact with the free ends of said first core-supporting and current-carrying pins, the free ends of said second core-supporting and current-carrying pins, and the free ends of said first and second core-supporting pins, a spring-biased shorting bar mounted on said base member and having a contact portion for engaging the free ends of said first core-supporting pin and said auxiliary pickup pin, said shorting bar contact portion engaging said first core-supporting pin between the fixed end thereof and the point of engagement therewith of said sliding contact, interposer means on said switching arm for disengaging said shorting bar contact portion in one position of said arm, a single-turn, open pickup coil including said pickup pin, said shorting bar contact portion, a winding linked to a core on said second core-supporting pin, and means coupling said winding to the fixed ends of said first core-supporting pin and said auxiliary pickup pin, the sense of winding and coupling of said pickup coil being such as to have voltages of opposite polarity induced therein by cores on said core-supporting pins upon the application of current pulses thereto, and voltage responsive utilization means coupled to said pickup coil.

10. Apparatus for comparing the characteristics of magnetic cores having a hole therethrough with the characteristics of a standard magnetic core, said apparatus comprising first and second electrically-conductive, non-magnetic pins, a base member supporting said pins at fixed ends thereof, said first pin receiving a standard core at a free end thereof, said second pin receiving a test core at a free end thereof, means for applying current pulses to said pins in one direction and alternatively in the opposite direction, said pulse applying means being connected to the fixed ends of said pins, first electrical contact means for connecting the free ends of said pins, a single turn, pickup coil including second and third electrical contact means, and conductor means for coupling said third contact means electrically to the fixed end of said second pin and inductively to a standard core on said first pin, and means for engaging said first contact means with the free ends of said pins and for engaging said second contact means with said third contact means and the free end of said second pin, said second contact means engaging said second pin at a point intermediate the fixed end of said pin and the point of engagement of said first contact means.

11. Apparatus for comparing the characteristics of magnetic cores having a hole therethrough with the characteristics of a standard magnetic core, said apparatus comprising first and second electrically-conductive, non-magnetic pins adapted to have respectively a standard core and a test core mounted thereon, means for applying current pulses to said pins in series, a single turn, pickup coil including a winding adapted to be linked to said standard core, and means coupling said winding to one and the other end of said second pin, the sense of winding and coupling of said pickup coil being such as to have voltages of opposite polarity induced therein by said standard core and test core upon the application of a current pulse to said pins, and means coupled to said pickup coil for determining the net voltage induced therein.

12. A device for testing the characteristics of magnetic elements comprising an electrically-conductive non-magnetic pin to which magnetic elements to be tested are to be linked, an energizing current path, an open pickup coil, and means for connecting said current path and said pickup coil to said pin to complete said current path and said pickup coil through said pin whereby a voltage is induced in said pickup coil upon a change of current in said pin.

13. A device for testing the characteristics of magnetic elements comprising an electrically-conductive non-magnetic pin to which magnetic elements to be tested are to be linked, an energizing current path, an open pickup coil, and means for connecting said current path and said pickup coil to said pin to complete said current path and said pickup coil through said pin whereby a voltage is induced in said pickup coil upon a change of current in said pin, said pin being fixed at one end and free at the other end, said connecting means including a first contact means connected to said current path, a second contact means connected to said pickup coil, and means for engaging said first and second contact means with the free end of said pin, said second contact means engaging said pin at a point intermediate the fixed end of said pin and the point of engagement of said first contact means.

14. A device for testing the characteristics of magnetic elements comprising an electrically-conductive non-magnetic pin to which magnetic elements to be tested are to be linked, an energizing current path, an open pickup coil, and means for connecting said current path and said pickup coil to said pin to complete said current path and said pickup coil through said pin whereby a voltage is induced in said pickup coil upon a change of current in said pin, said device being adapted for comparing said magnetic element characteristics with the characteristics of a standard magnetic element, said connecting means including means for linking said current path to said standard element, said pickup coil including a winding adapted to be linked to said standard element and connected to have a voltage induced therein of opposite polarity to said first-mentioned voltage upon a change of current in said pin.

*15. Apparatus for testing the characteristics of magnetic cores having a hole therethrough comprising means for supporting a core to be tested including an electrically-conductive pin supported at a fixed end and adapted to receive cores at a free end thereof, means for applying current pulses alternatively to said pin in opposite directions therethrough, said pulse applying means being connected to the fixed end of said pin, a single-turn, open pickup coil coupled to the fixed end of said pin, voltage responsive utilization means coupled to said pickup coil, and contact means for removably connecting said pulse applying means and completing said pickup coil to the free end of said pin.*

*16. Apparatus for comparing the characteristics of magnetic cores having a hole therethrough with the characteristics of a standard magnetic core, said apparatus comprising first and second electrically-conductive pins adapted to have respectively a standard core and a test core mounted thereon, means for applying current pulses to said pins in series, a single turn, pickup coil including a winding adapted to be linked to said standard core, and means coupling said winding to one and the other end of said second pin, the sense of winding and coupling of said pickup coil being such as to have voltages of opposite polarity induced therein by said standard core and test core upon the application of a current pulse to said pins, and means coupled to said pickup coil for determining the net voltage induced therein.*

*17. A device for testing the characteristics of magnetic elements comprising an electrically-conductive pin to which magnetic elements to be tested are to be linked, an energizing current path, an open pickup coil, and means for connecting said current path and said pickup coil to said pin to complete said current path and said pickup coil through said pin whereby a voltage is induced in said pickup coil upon a change of current in said pin.*

*18. A device for testing the characteristics of magnetic elements comprising an electrically-conductive pin to which magnetic elements to be tested are to be linked, an energizing current path, an open pickup coil, and means for connecting said current path and said pickup coil to said pin to complete said current path and said pickup coil through said pin whereby a voltage is induced in said pickup coil upon a change of current in said pin, said device being adapted for comparing said magnetic element characteristics with the characteristics of a standard magnetic element, said connecting means including means for linking said current path to said standard element, said pickup coil including a winding adapted to be linked to said standard element and connected to have a voltage induced therein of opposite polarity to said first-mentioned voltage upon a change of current in said pin.*

References Cited in the file of this patent or the original patent

UNITED STATES PATENTS

| | | |
|---|---|---|
| 1,570,948 | Crouch | Jan. 26, 1926 |
| 2,202,884 | Zuschlag | June 4, 1940 |
| 2,313,516 | Brubaker et al. | Mar. 9, 1943 |